US012675805B2

(12) United States Patent
He et al.

(10) Patent No.: US 12,675,805 B2
(45) Date of Patent: Jul. 7, 2026

(54) SELECTING A WAREHOUSE LOCATION FOR DISPLAYING AN INVENTORY OF ITEMS TO A USER OF AN ONLINE CONCIERGE SYSTEM BASED ON PREDICTED AVAILABILITIES OF ITEMS AT THE WAREHOUSE OVER TIME

(71) Applicant: Maplebear Inc., San Francisco, CA (US)

(72) Inventors: Ze He, Sunnyvale, CA (US); Asif Haque, Orinda, CA (US); Allan Stewart, Berkeley, CA (US); Haixun Wang, Bellevue, WA (US); Xinyu Li, Kent, OH (US)

(73) Assignee: Maplebear Inc., San Francisco, CA (US)

( * ) Notice: Subject to any disclaimer, the term of this patent is extended or adjusted under 35 U.S.C. 154(b) by 20 days.

(21) Appl. No.: 18/761,756

(22) Filed: Jul. 2, 2024

(65) Prior Publication Data

US 2024/0354793 A1     Oct. 24, 2024

Related U.S. Application Data

(63) Continuation of application No. 17/572,450, filed on Jan. 10, 2022, now Pat. No. 12,033,172.

(51) Int. Cl.
G06Q 30/0204 (2023.01)
G06N 3/049 (2023.01)
(Continued)

(52) U.S. Cl.
CPC ......... G06Q 30/0205 (2013.01); G06N 3/049 (2013.01); G06N 3/084 (2013.01);
(Continued)

(58) Field of Classification Search
CPC ........... G06Q 30/0205; G06Q 30/0282; G06Q 30/0635; G06Q 30/0639; G06Q 30/0641; G06N 3/049; G06N 3/084
See application file for complete search history.

(56) References Cited

U.S. PATENT DOCUMENTS 9,421,580 B2     8/2016   Hansl et al.
10,467,526 B1 *  11/2019  Appalaraju .............. G06N 3/08
(Continued)

FOREIGN PATENT DOCUMENTS

CA       3155814 A1       5/2021
KR       20210042701 A  * 4/2021   ............. G06N 3/044

OTHER PUBLICATIONS

Ardjmand et al. "A hybrid artificial neural network, genetic algorithm and column generation heuristic for minimizing makespan in manual order picking operations" (2020) (https://www.sciencedirect.com/science/article/pii/S0957417420303900) (Year: 2020).*
(Continued)

*Primary Examiner* — Sujay Koneru
(74) *Attorney, Agent, or Firm* — Fenwick & West LLP

(57) ABSTRACT

An online concierge system allows users to order items from a warehouse, which may have multiple warehouse locations. The online concierge system provides a user interface to users for ordering the items, with the user interface providing an indication of whether an item is predicted to be available at the warehouse at different times. To predict availability of an item model at different times, the online concierge system selects data from historical information about availability of items at one or more warehouses based on temporal, geospatial, and socioeconomic information about observations of historical availability of items at warehouses. The online concierge system accounts for distances between observations and a time and geographic (Continued)

location in a feature space to select observations for predicting item availability at the time and the geographic location.

20 Claims, 5 Drawing Sheets

(51) Int. Cl.
| | | |
|---|---|---|
| *G06N 3/084* | (2023.01) |
| *G06Q 30/0282* | (2023.01) |
| *G06Q 30/0601* | (2023.01) |

(52) U.S. Cl.
CPC ..... *G06Q 30/0282* (2013.01); *G06Q 30/0635* (2013.01); *G06Q 30/0639* (2013.01); *G06Q 30/0641* (2013.01)

(56) References Cited

U.S. PATENT DOCUMENTS

| | | | |
|---|---|---|---|
| 2005/0027721 A1 | 2/2005 | Saenz |
| 2005/0278062 A1* | 12/2005 | Janert | ................... G06Q 10/08 |
| | | | 700/214 |
| 2010/0145929 A1 | 6/2010 | Burger et al. |

| | | | |
|---|---|---|---|
| 2013/0179309 A1 | 7/2013 | Heil et al. |
| 2013/0211973 A1 | 8/2013 | Tomlinson |
| 2015/0112826 A1* | 4/2015 | Crutchfield, Jr. .. G06Q 30/0643 |
| | | | 705/26.1 |
| 2015/0307278 A1 | 10/2015 | Wickham et al. |
| 2017/0061501 A1* | 3/2017 | Horwich | ............... G06F 16/283 |
| 2017/0064551 A1 | 3/2017 | Block |
| 2017/0107055 A1 | 4/2017 | Magens et al. |
| 2019/0236740 A1* | 8/2019 | Rao | ........................ G06Q 10/08 |
| 2020/0039747 A1 | 2/2020 | Ahmann et al. |
| 2020/0219171 A1 | 7/2020 | Zhuang et al. |
| 2021/0042701 A1 | 2/2021 | Ovadia et al. |
| 2021/0309460 A1 | 10/2021 | Kim et al. |
| 2022/0366494 A1 | 11/2022 | Cella et al. |
| 2022/0391965 A1* | 12/2022 | Putrevu | ................... G06N 3/09 |
| 2022/0398605 A1* | 12/2022 | Chen | ........................ G06N 3/09 |
| 2023/0034221 A1* | 2/2023 | Deng | .................... G06N 20/00 |
| 2024/0070697 A1 | 2/2024 | Deng et al. |

OTHER PUBLICATIONS

Shankar, V., "How Artificial Intelligence (AI) Is Reshaping Retailing," Journal of Retailing 94, Dec. 2018, pp. vi-xi.
United States Office Action, U.S. Appl. No. 17/572,450, Nov. 24, 2023, 10 pages.

* cited by examiner

100

SELECTING A WAREHOUSE LOCATION
FOR DISPLAYING AN INVENTORY OF
ITEMS TO A USER OF AN ONLINE
CONCIERGE SYSTEM BASED ON
PREDICTED AVAILABILITIES OF ITEMS AT
THE WAREHOUSE OVER TIME

CROSS REFERENCE TO RELATED
APPLICATION

This application is a continuation of U.S. patent application Ser. No. 17/572,450, filed Jan. 10, 2022, which is incorporated by reference herein in its entirety.

BACKGROUND

This disclosure relates generally to ordering an item through an online concierge system, and more specifically to accounting for predicted availabilities of items at warehouses at different times when selecting a specific location of a warehouse from which an inventory of available items is displayed to a user and displaying predicted availabilities of items at a warehouse at different times to the user.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Many warehouses have multiple physical locations which may have different items available at different times. For example, certain items offered by a warehouse are available at a specific location, while another location of the warehouse does not have the certain items available. This variance in items available at different locations of a warehouse affects an inventory of items an online concierge system displays to a user for selecting items to include in an order. Additionally, conventional online concierge systems may determine predicted availability of items at a warehouse and identify the predicted availability of different items to a user creating an order. However, the availability predicted by conventional online concierge systems identify an availability of items predicted at a particular moment, such as when an item is displayed to the user and does not provide a prediction of availability of items at different times, such as at later times.

When a conventional online concierge system receives a selection of a warehouse from a user for creating an order, the conventional online concierge system identifies a location of the warehouse physically closest to a location identified by the order. For example, the online concierge system determines physical distances between locations of the warehouse and the location identified by the order and selects a location of the warehouse having a minimum distance to the location identified by the order. However, a shopper fulfilling the order may obtain items for the order from a different location of the warehouse, so items available to the shopper when fulfilling the order may differ from the items identified to the user as available when creating the order. While using distance between locations of a warehouse and a location identified by the order allows an online concierge system to reduce distance traveled by a shopper fulfilling the order, conventional online concierge systems do not account for availability of items at different warehouse locations and at different times.

SUMMARY

An online concierge system leverages information about an item, a warehouse for obtaining the item, and a time for obtaining the item to determine a predicted availability of the item at the warehouse. This allows the online concierge system to predict an availability of an item at a warehouse at a particular time, such as a time when an order is being created by a user. However, availability of an item at the warehouse 110 changes over time. While the availability of the item at the particular time at the warehouse provides a user with information when the user is placing an order, availability of the item at the warehouse fluctuates during different times, such as at different times within a day. To provide users with additional information about predicted availability of items at a warehouse at different times, the online concierge system obtains availability information for items at one or more warehouses, with availability information indicating whether an item was located within a warehouse. The online concierge system may obtain availability information from various sources in various embodiments. Example sources of availability information include shoppers fulfilling one or more orders at a warehouse, inventory information received from the warehouse, users providing information about item availability, one or more third party systems providing inventory information for the warehouse, or any combination thereof.

Availability information obtained for an item includes an observation comprising identifier of an item, an identifier of a warehouse, a label indicating whether the item was located at the warehouse, and contextual information. In various embodiments, the label has a particular value when the item was located at the warehouse and has an alternative value when the item was not located at the warehouse. In various embodiments, the contextual information includes temporal information, geospatial information, and socioeconomic information. The temporal information indicates a time when the availability information was obtained. For example, the temporal information identifies an hour of the day when the availability information was obtained, a day of the week when the availability information was obtained, a week of the year when the availability information was obtained, and a month of the year when the availability information was obtained. Including temporal information in the availability information allows the availability information to account for different frequencies with which items are restocked in a warehouse, allowing the temporal information to account for the item being identified within the warehouse at different times, the item being restocked from storage in the warehouse to shopper-accessible locations within the warehouse, restocking of the item to the warehouse, varying rates at which the item is obtained by users at different times, as well as other factors affecting availability of the item to shoppers at the warehouse.

Geospatial information included in the availability information identifies a physical location of the warehouse. For example, the geospatial information includes a latitude and a longitude of the warehouse, a city of the warehouse, a state of the warehouse, a zip code of the warehouse, a nation of the warehouse, or any combination thereof. Socioeconomic information included in the availability information describes a geographic region including the warehouse. Example socioeconomic information includes population density of the region including the warehouse, income distribution of people in the region including the warehouse, demographic information of people in the region including the warehouse, occupations of people in the region including the warehouse, traffic volume of the region including the warehouse, types of commutes for people in the region including the warehouse, or any combination thereof. The socioeconomic information for the availability information may be obtained from one or more third party systems or other external sources in some embodiments.

Hence, the obtained availability information for the item includes multiple observations that each include a label indicating whether the item was located at the warehouse and contextual information comprising a combination of temporal information, geographic information, and socioeconomic information. The online concierge system maps each observation in the availability information to a multi-dimensional feature space, with dimensions corresponding to temporal information, geographic information, and socioeconomic information. This allows the online concierge system to represent each observation of the availability information in a multi-dimensional feature space.

From the observations mapped to the feature space, the online concierge system trains a temporal availability model that determines a predicted availability of the item at the warehouse at different times. To train the temporal availability mode, the online concierge system selects the warehouse, an item, and a combination of a time and a geographic location including the warehouse. The online concierge system determines distances between each of at least a set of the observations for the selected item and the selected warehouse, item, and combination of the time and the geographic location or between each observation for the selected warehouse and the selected item and the selected combination of the time and the geographic location. The determined distances are for the selected warehouse and the selected item, so the online concierge system determines distances from observations of availability information obtained for the item and the selected combination of the time and the geographic location. For example, the online concierge system determines a Euclidean distance between each of at least a set of observations and the selected combination of the time and the geographic location. As another example, the online concierge system determines a Manhattan distance between each of at least a set of observations and the selected combination of the time and the geographic location. However, the online concierge system may determine any suitable type of distance between each of multiple observations and the selected combination of the time and the geographic location in various embodiments.

From the determined distances between multiple observations of the item mapped to the feature space and the selected combination of the time and the geographic location, the online concierge system selects observations as samples based on the determined distances between observations and the selected combination of the time and the geographic location. In various embodiments, the online concierge system maintains associations between an observation and a determined distance between the observation and the selected combination of the time and the geographic location. For example, the online concierge system ranks observations based on their associated determined distance from the selected combination of the time and the geographic location, with observations having smaller determined distances from the selected combination of the time and the geographic region having higher positions in the ranking. From the ranked observations, the online concierge system selects a set of observations as samples. For example, the online concierge system selects observations having at least a threshold position in the ranking as samples, allowing the online concierge system to select the samples as a specific number of observations, specified by the threshold position, having the shortest distances to the selected combination of the time and the geographic location. In various embodiments, the online concierge system determines the specific number of observations to select as samples using methods including empirical data analysis, grid search, random search, or any other suitable method for determining or tuning a hyperparameter of a machine learning model. The online concierge system specifies the threshold position in the ranking as the specific number of observations to determine a number of observations selected as samples. By ranking observations based on their distances from the selected combination of time and geographic location and selecting samples from the ranking, the online concierge system is capable of accounting for differences in distances between the observations mapped to the feature space and the selected combination of the time and the geographic location caused by different frequencies with which items are purchased. For example, if the item is frequently purchased, the observations selected as samples have smaller distances from the selected combination of time and the geographic location; however, if the item is infrequently purchased, the observations selected as samples have larger distances from the selected warehouse, item, and combination of the time and the geographic location to acquire the specific number of samples.

As samples with larger distances from the selected combination of the time and the geographic location are observations with greater temporal or physical distance from the selected time, the samples with larger distances from the selected warehouse, item, and combination of the time and the geographic location have less relevance to the predicted availability of the item at the warehouse at the combination of the selected combination of the time and the geographic location. To account for the differing relevance of different samples, the online concierge system determines a weight for each sample, with the weight for a sample inversely related to a distance between the sample and the selected combination of the time and the geographic location. For example, the weight for a sample is inversely proportional to the distance between the sample and the selected combination of the time and the geographic location. As another example, the weight for a sample exponentially decays with a decay constant based on the distance between the sample and the selected combination of the time and the geographic location (e.g., the decay constant is the distance between the sample and the selected combination of the time and the geographic location). However, in various embodiments, the weight of a sample has any suitable negative relationship to the distance between the sample and the selected combination of the time and the geographic location, so samples with smaller distances to the selected combination of the time and the geographic location have larger weights and samples with larger distances to the selected combination of the time and the geographic location have smaller weights.

From the weighted samples, the online concierge system determines a score for the selected combination of the time and the geographic location. In various embodiments, the online concierge system determines the score by calculating a weighted sum of the labels for each sample, with the label for a sample weighted by the weight determined for the sample). As the label has a particular value when the item was located at the warehouse and has an alternative value when the item was not located at the warehouse, the particular value or the alternative value for a sample is multiplied by the corresponding weight for the sample when calculating the weighted sum. The online concierge system also determines a full availability score for the selected combination of the time and the geographic location, with the full availability score determined as a sum of the particular value indicating the item was located at the warehouse for each sample weighted by the corresponding weight determined for each sample. The score determined for the selected combination of the time and the geographic location is a ratio of the weighted sum to the full availability score in various embodiments. However, in other embodiments, the online concierge system determines the score for the selected combination of the time and the geographic location from the samples and their corresponding weights using any suitable method. Hence, a higher score corresponds to an increased likelihood of the item being available at the warehouse for the selected combination of the time and the geographic location, with a lower score corresponding to a decreased likelihood of the item being available at the warehouse for the selected combination of the time and the geographic location.

In various embodiments, the online concierge system selects multiple combinations of times and geographic locations for different warehouses and items. For each group of warehouse, item, and combination of time and geographic location, the online concierge system determines distances between observations and a selected combination of time and geographic location and selects samples from the observations based on the distances, as further described above. For each sample selected for a group of warehouse, item, and combination of time and geographic location, the online concierge system determines a weight for the sample and uses the weighted samples to determine a score for the selected time and geographic location for the warehouse and the item included in a group, as further described above. In various embodiments, the online concierge system stores a determined score in association with a combination of a time, a geographic location, an item, and a warehouse, allowing the online concierge system to maintain scores for different items available at different warehouses at various combinations of time and geographic location. The online concierge system periodically determines the score for multiple groups of selected times, geographic locations, warehouses, and items, allowing the online concierge system to update and to maintain stored scores for different groups of selected times, geographic locations, warehouses, and items.

The online concierge system leverages inventory information received from the warehouse or from one or more third party systems managing inventory of the warehouse to generate training data for the temporal availability model using the scores for the warehouse, the item, and various combinations of times and geographic locations. The online concierge system may periodically retrain the temporal availability model or may retrain the temporal availability model when one or more conditions are satisfied.

In some embodiments, the online concierge system applies the trained temporal availability model to each of at least a set of groups of items, warehouses, and combinations of time and geographic location to generate probabilities of different items being available at different warehouses at different combinations of times and geographic locations. The online concierge system stores predicted likelihoods output by the temporal availability model in association with a group of an identifier of an item, an identifier of a warehouse, and a combination of a time and a geographic location, allowing the online concierge system. In other embodiments, the online concierge system stores the score determined for the group of an item, a warehouse, and a combination of time and geographic location in association with the group.

When the online concierge system receives a request to create an order from a user that identifies the warehouse and a requested geographic location, the online concierge system obtains predicted likelihoods of various items, such as each item of a set or each item offered by the warehouse, being available at the warehouse at the requested geographic location at different times. In some embodiments, the online concierge system retrieves previously determined predicted likelihoods of items being available at the warehouse at the requested geographic location at different times. Alternatively, the online concierge system retrieves stored scores for groups of items, warehouse, and combination of times and geographic locations where the groups include the warehouse and the requested geographic location identified by the request to create the order. The online concierge system applies the temporal availability model to the retrieved groups to obtain predicted likelihoods of different items being available at the warehouse at the requested geographic location at different times.

When the online concierge system receives a request for information about an item to include in the order, the online concierge system generates an interface including information about the requested item that includes predicted likelihoods of the item being available at the warehouse in the geographic location identified by the request to create the order at different times. The online concierge system transmits the interface to a client device of the user for display. For example, a client device of the user receives the interface from the online concierge system and displays the interface in a customer mobile application executing on the client device of the user.

In various embodiments, the interface displays different times and an indication of a predicted availability of the item at the warehouse at each of the different times. For example, the interface displays an indication proximate to each time, with different indications displayed when the predicted likelihood of the item displayed by the interface being available at the warehouse and the geographic location identified by the order at the time satisfies different conditions. In an example, different indications correspond to different ranges of predicted likelihoods of the item displayed by the interface being available at the warehouse and at the geographic location identified by the order at the time.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
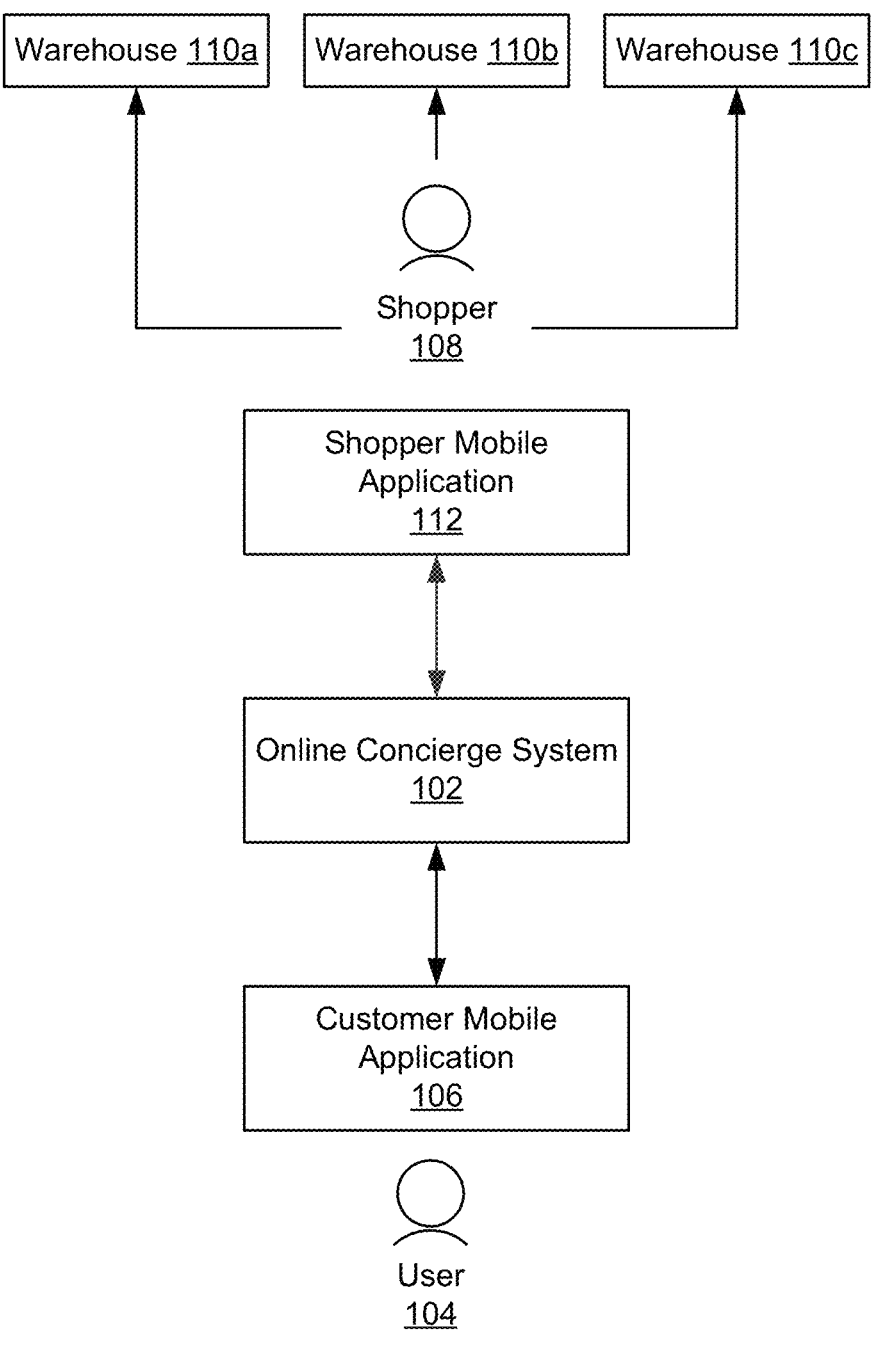
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
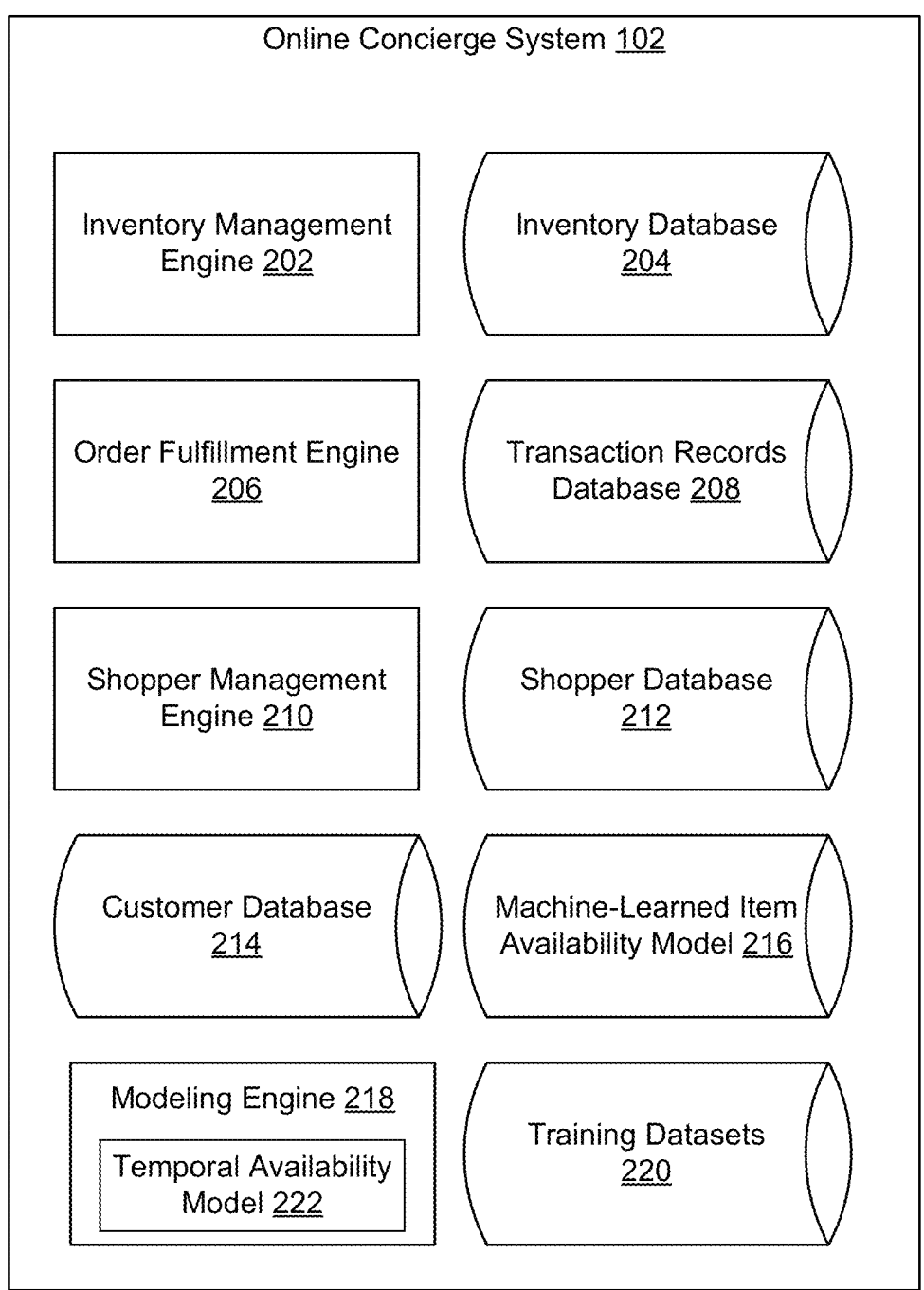
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records-one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

An interface generated by the order fulfillment engine 206 includes information identifying predicted likelihoods of an item being available at a warehouse 110 at different times. As further described below in conjunction with FIG. 4, the order fulfillment engine 206 obtains predicted likelihoods of an item's availability at a warehouse 110 identified by an order and at a requested geographic location identified by the order at different times from a temporal availability model 222. Based on the predicted likelihoods of the item's availability at different times, an interface generated by the order fulfillment engine 206 displays different times with an indication of the item's predicted likelihood of being available at the warehouse 110 proximate to a corresponding time for which the predicted likelihood was determined, as further described below in conjunction with FIG. 5.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on. Methods that can be used to identify a warehouse 110 at which a shopper 108 can likely find most or all items in an order are described with respect to FIG. 4.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g., if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weigh these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

In various embodiments, the training datasets 220 also include training data obtained from warehouses 110 or from third party systems managing or tracking inventory of one or more warehouses 110 that indicate times when items offered by a warehouse 110 were available or were unavailable. For example, the training data includes a group of a warehouse 110, a geographic location of the warehouse, a time, and tags corresponding to different items indicating whether an item was available or was unavailable at the warehouse 110 at the time. This training data may be periodically obtained by the online concierge system 102 or may be obtained by the online concierge system 102 when one or more conditions occur.

Additionally, the modeling engine 218 trains and maintains a temporal availability model 222 that determines likelihoods of an item being available at a warehouse 100 at different times. The temporal availability model 222 receives a combination of an item and a warehouse 110 and outputs predicted availability of the item at the warehouse at different times, such as during each of a plurality of time intervals. In various embodiments, the order fulfillment engine 206 receives predicted likelihoods of items being available (also referred to as "predicted availabilities") at a warehouse 110 at different times from the temporal availability model 222 and displays indications of the item's predicted availabilities at the warehouse 110 at different times in an interface of a shopper mobile application. For example, the interface identifies different time intervals and displays an indication in conjunction with each time interval, with the indication for a time interval based on a predicted availability of the item at the warehouse 110 at the time interval. Training and application of the temporal availability model 222 is further described below in conjunction with FIG. 4.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
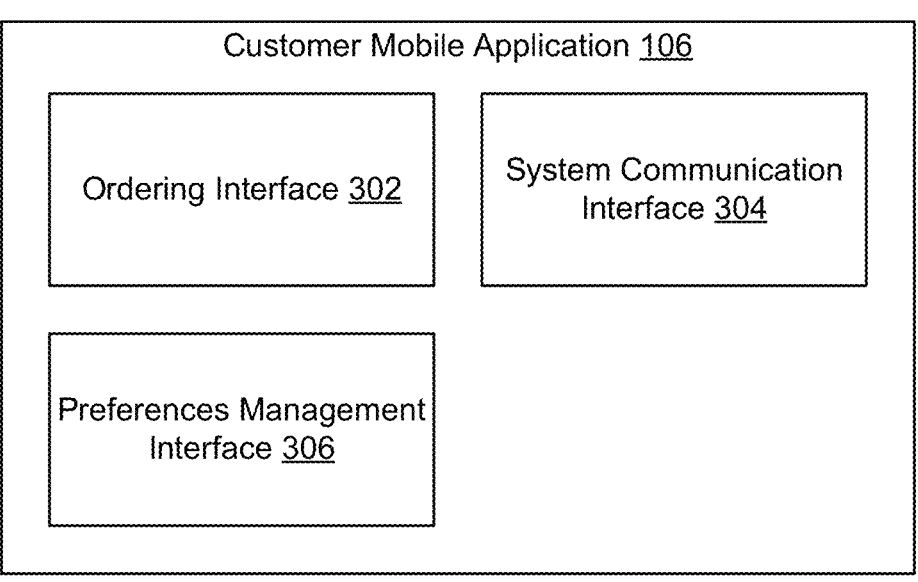
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
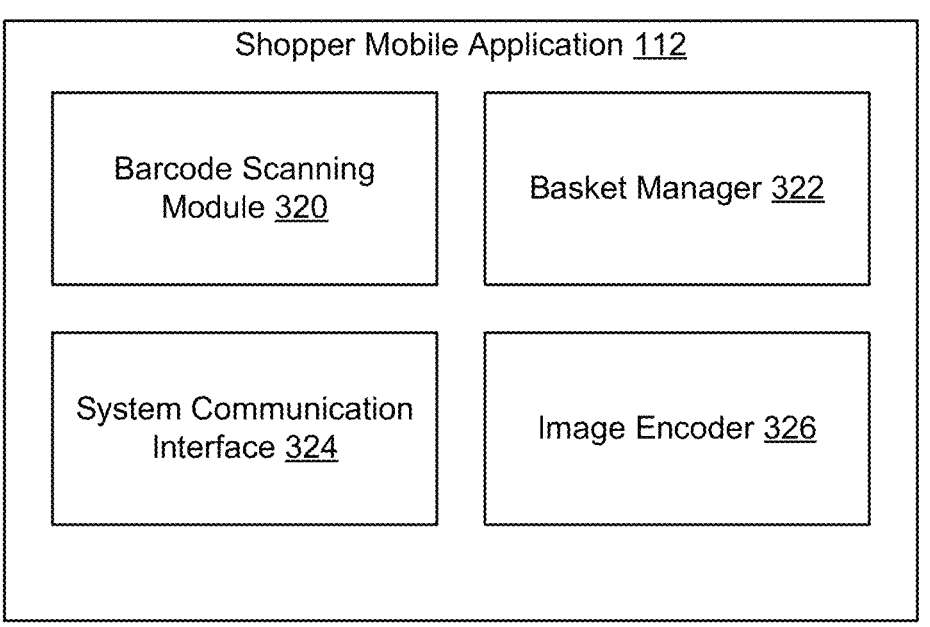
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Availability of an Item at Different Times

Figure 4:
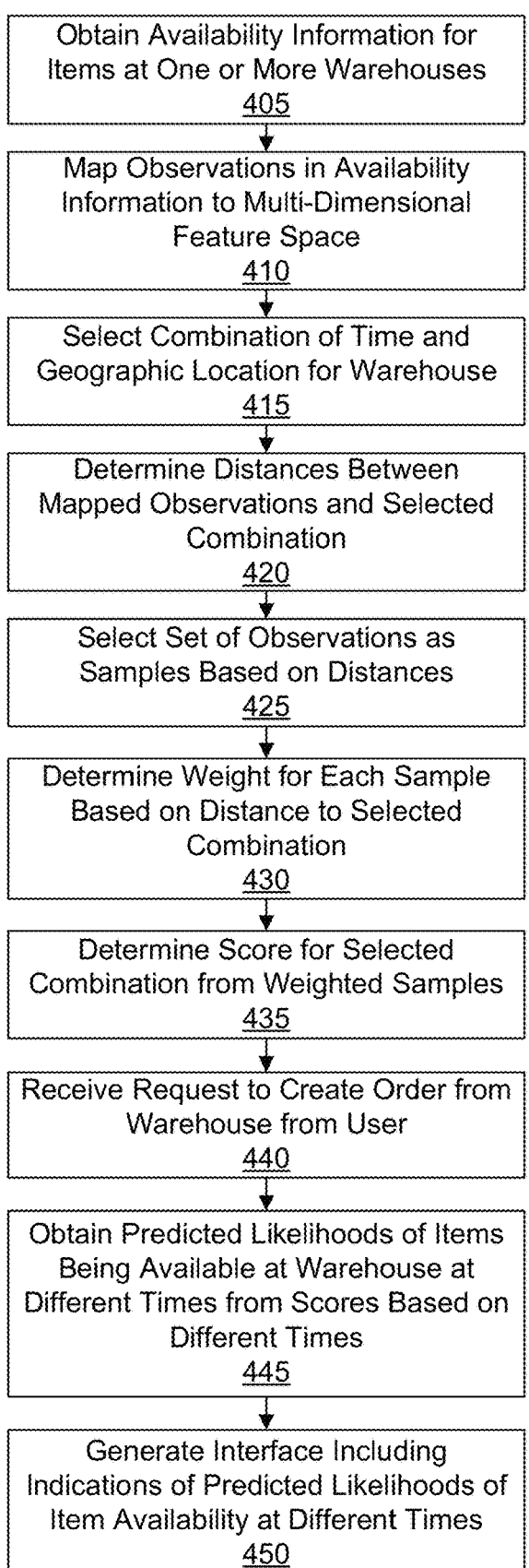
FIG. 4 is a flowchart of a method for the online concierge system predicting availability of an item at a warehouse at different times, according to one embodiment.

FIG. 4 is a flowchart of one embodiment of a method for the online concierge system 102 predicting availability of an item at a warehouse 110 at different times. In various embodiments, the method includes different or additional steps than those described in conjunction with FIG. 4. Further, in some embodiments, the online concierge system 102 performs steps of the method in a different order than the order described in conjunction with FIG. 4.

As further described above in conjunction with FIG. 2, the online concierge system 102 maintains a machine-learned item availability model 216 that leverages information about an item, the warehouse 110 for picking the item, and the time for picking the item to determine a predicted availability of the item at the warehouse 110. Hence, the machine-learned item availability model allows the online concierge system 102 to predict an availability of an item at a warehouse 110 at a particular time, such as a time when an order is being created by a user. However, availability of an item at the warehouse 110 changes over time. While the availability of the item at the particular time at the warehouse 110 provides a user with information when the user is placing an order, the machine-learned item availability model 216 does not provide the online concierge system 102 with information about likely or historical fluctuations in availability of the item at the warehouse 110 during different times, such as at different times within a day.

To provide users with additional information about predicted availability of items at a warehouse 110 at different times, the online concierge system 102 obtains 405 availability information for items at one or more warehouses 110, with availability information indicating whether an item was located within a warehouse 110. The online concierge system 102 may obtain 405 availability information from various sources in various embodiments. Example sources of availability information include shoppers fulfilling one or more orders at a warehouse 110, inventory information received from the warehouse 110, users providing information about item availability, one or more third party systems providing inventory information for the warehouse 110, or any combination thereof.

Availability information obtained 405 for an item includes an observation comprising identifier of an item, an identifier of a warehouse 110, a label indicating whether the item was located at the warehouse 110, and contextual information. In various embodiments, the label has a particular value when the item was located at the warehouse 110 and has an alternative value when the item was not located at the warehouse 110. In various embodiments, the contextual information includes temporal information, geospatial information, and socioeconomic information. The temporal information indicates a time when the availability information was obtained 405. For example, the temporal information identifies an hour of the day when the availability information was obtained 405, a day of the week when the availability information was obtained 405, a week of the year when the availability information was obtained 405, and a month of the year when the availability information was obtained 405. Including temporal information in the availability information 405 allows the availability information to account for different frequencies with which items are restocked in a warehouse 110, allowing the temporal information to account for the item being identified within the warehouse 110 at different times, the item being restocked from storage in the warehouse 110 to shopper-accessible locations within the warehouse 110, restocking of the item to the warehouse 110, varying rates at which the item is obtained by users at different times, as well as other factors affecting availability of the item to shoppers at the warehouse 110.

Geospatial information included in the availability information identifies a physical location of the warehouse 110. For example, the geospatial information includes a latitude and a longitude of the warehouse 110, a city of the warehouse 110, a state of the warehouse 110, a zip code of the warehouse 110, a nation of the warehouse 110, or any combination thereof. Socioeconomic information included in the availability information describes a geographic region including the warehouse 110. Example socioeconomic information includes population density of the region including the warehouse 110, income distribution of people in the region including the warehouse 110, demographic information of people in the region including the warehouse 110, occupations of people in the region including the warehouse 110, traffic volume of the region including the warehouse 110, types of commutes for people in the region including the warehouse 110, or any combination thereof. The socioeconomic information for the availability information may be obtained from one or more third party systems or other external sources in some embodiments.

Hence, the obtained 405 availability information for the item includes multiple observations that each include a label indicating whether the item was located at the warehouse 110 and contextual information comprising a combination of temporal information, geographic information, and socioeconomic information. The online concierge system 102 maps 410 each observation in the availability information to a multi-dimensional feature space, with dimensions corresponding to temporal information, geographic information, and socioeconomic information. This allows the online concierge system 102 to represent each observation of the availability information in a multi-dimensional feature space.

From the observations mapped to the feature space, the online concierge system 102 trains a temporal availability model 222. As further described above, in conjunction with FIG. 2, the temporal availability model 222 determines a predicted availability of the item at the warehouse 110 at different times. To train the temporal availability model 222, the online concierge system 102 selects 415 the warehouse 110, an item, and a combination of a time and a geographic location including the warehouse 110. The online concierge system 102 determines 420 distances between each of at least a set of the observations for the selected item and the selected warehouse 110, item, and combination of the time and the geographic location or between each observation for the selected warehouse 110 and the selected item and the selected combination of the time and the geographic location. The determined distances are for the selected warehouse 110 and the selected item, so the online concierge system 102 determines 420 distances from observations of availability information obtained 405 for the item and the selected combination of the time and the geographic location. For example, the online concierge system 102 determines a Euclidean distance between each of at least a set of observations and the selected combination of the time and the geographic location. As another example, the online concierge system 102 determines a Manhattan distance between each of at least a set of observations and the selected combination of the time and the geographic location. However, the online concierge system 102 may determine 420 any suitable type of distance between each of multiple observations and the selected combination of the time and the geographic location in various embodiments.

From the determined distances between multiple observations of the item mapped 410 to the feature space and the selected combination of the time and the geographic location, the online concierge system selects 425 observations as samples based on the determined distances between observations and the selected combination of the time and the geographic location. In various embodiments, the online concierge system 102 maintains associations between an observation and a determined distance between the observation and the selected combination of the time and the geographic location. For example, the online concierge system 102 ranks observations based on their associated determined distance from the selected combination of the time and the geographic location, with observations having smaller determined distances from the selected combination of the time and the geographic region having higher positions in the ranking. From the ranked observations, the online concierge system 102 selects 425 a set of observations as samples. For example, the online concierge system 102 selects 425 observations having at least a threshold position in the ranking as samples, allowing the online concierge system 102 to select 425 the samples as a specific number of observations, specified by the threshold position, having the shortest distances to the selected combination of the time and the geographic location. In various embodiments, the online concierge system 102 determines the specific number of observations to select 425 as samples using methods including empirical data analysis, grid search, random search, or any other suitable method for determining or tuning a hyperparameter of a machine learning model. The online concierge system 102 specifies the threshold position in the ranking as the specific number of observations to determine a number of observations selected 425 as samples. By ranking observations based on their distances from the selected combination of time and geographic location and selecting 425 samples from the ranking, the online concierge system 102 is capable of accounting for differences in distances between the observations mapped 415 to the feature space and the selected combination of the time and the geographic location caused by different frequencies with which items are purchased. For example, if the item is frequently purchased, the observations selected 425 as samples have smaller distances from the selected combination of the time and the geographic location; however, if the item is infrequently purchased, the observations selected 425 as samples have larger distances from the selected warehouse 110, item, and combination of the time and the geographic location to acquire the specific number of samples.

As samples with larger distances from the selected combination of the time and the geographic location are observations with greater temporal or physical distance from the selected time, the samples with larger distances from the selected warehouse 110, item, and combination of the time and the geographic location have less relevance to the predicted availability of the item at the warehouse 110 at the combination of the selected combination of the time and the geographic location. To account for the differing relevance of different samples, the online concierge system 102 determines 430 a weight for each sample, with the weight for a sample inversely related to a distance between the sample and the selected combination of the time and the geographic location. For example, the weight for a sample is inversely proportional to the distance between the sample and the selected combination of the time and the geographic location. As another example, the weight for a sample exponentially decays with a decay constant based on the distance between the sample and the selected combination of the time and the geographic location (e.g., the decay constant is the distance between the sample and the selected combination of the time and the geographic location). However, in various embodiments, the weight of a sample has any suitable negative relationship to the distance between the sample and the selected combination of the time and the geographic location, so samples with smaller distances to the selected combination of the time and the geographic location have larger weights and samples with larger distances to the selected combination of the time and the geographic location have smaller weights.

From the weighted samples, the online concierge system 102 determines 435 a score for the selected combination of the time and the geographic location. In various embodiments, the online concierge system 102 determines 435 the score by calculating a weighted sum of the labels for each sample, with the label for a sample weighted by the weight determined 430 for the sample). As the label has a particular value when the item was located at the warehouse 110 and has an alternative value when the item was not located at the warehouse 110, the particular value or the alternative value for a sample is multiplied by the corresponding weight for the sample when calculating the weighted sum. The online concierge system 102 also determines a full availability score for the selected combination of the time and the geographic location, with the full availability score determined as a sum of the particular value indicating the item was located at the warehouse 110 for each sample weighted by the corresponding weight determined 430 for each sample. The score determined 435 for the selected combination of the time and the geographic location is a ratio of the weighted sum to the full availability score in various embodiments. However, in other embodiments, the online concierge system 102 determines 435 the score for the selected combination of the time and the geographic location from the samples and their corresponding weights using any suitable method. Hence, a higher score corresponds to an increased likelihood of the item being available at the warehouse 110 for the selected combination of the time and the geographic location, with a lower score corresponding to a decreased likelihood of the item being available at the warehouse for the selected combination of the time and the geographic location.

In various embodiments, the online concierge system 102 selects 415 multiple combinations of times and geographic locations for different warehouses 110 and items. For each group of warehouse 110, item, and combination of time and geographic location, the online concierge system 102 determines 420 distances between observations and a selected combination of time and geographic location and selects 425 samples from the observations based on the distances, as further described above. For each sample selected 425 for a group of warehouse 110, item, and combination of time and geographic location, the online concierge system 102 determines 430 a weight for the sample and uses the weighted samples to determine 435 a score for the selected time and geographic location for the warehouse 110 and the item included in a group, as further described above. In various embodiments, the online concierge system 102 stores a determined score in association with a combination of a time, a geographic location, an item, and a warehouse 110, allowing the online concierge system 102 to maintain scores for different items available at different warehouses 110 at various combinations of time and geographic location. The online concierge system 102 periodically determines 435 the score for multiple groups of selected times, geographic locations, warehouses 110, and items, allowing the online concierge system 102 to update and to maintain stored scores for different groups of selected times, geographic locations, warehouses 110, and items.

The online concierge system leverages inventory information received from the warehouse 110 or from one or more third party systems managing inventory of the warehouse 110 to generate training data for the temporal availability model 222 using the scores for the warehouse 110, the item, and various combinations of times and geographic locations. The training data includes a plurality of examples, with each example identifying a training warehouse 110, a training item, a combination of training time and training geographic location, and a score determined for the training warehouse 110, the training item, and the combination of training time and training geographic location; in other embodiments, an example may include additional information, such as socioeconomic information for the combination of training time and training geographic location. A tag is applied to each example based on the received inventory information. The tag applied to an example indicates whether the inventory of the training warehouse 110 had the training item available for shoppers at the combination of the training time and the training geographic location of the example. Hence, the tag has a first value when the training item was available for shoppers at the training warehouse 110 at the combination of the training time and the training geographic location of the example and has a second, different, value when the training item was not available for shoppers at the training warehouse 110 at the combination of the training time and the training geographic location of the example. Hence, the online concierge system 102 uses the inventory information from the training warehouse 110, or from a third party system, as the tags for training the temporal availability model 222, allowing the online concierge system 102 to leverage information from one or more training warehouses 110 describing availability of various training items for training the temporal availability model 222.

The online concierge system 102 initializes a plurality of layers of a neural network comprising the temporal availability model 222 and applies the temporal availability model 222 to each of a plurality of examples of the training data. Application of the temporal availability model 222 to an example of the training data generates a predicted likelihood of the training item of the example being available at the training warehouse 110 at the combination of the training time and training geographic location of the example. The online concierge system 102 determines an error term from a loss function based on a difference between the tag applied to the example of the training data and the likelihood of the training item of the example being available at the training warehouse 110 at the combination of the training time and training geographic location of the example. The online concierge system 102 repeatedly backpropagates the one or more error terms from the tag applied to an example of the training data and the predicted likelihood of the training item of the example being available at the training warehouse 110 at the combination of the training time and training geographic location of the example through layers of a network comprising the temporal availability model 222. The backpropagation of the one or more error terms is repeated by the online concierge system 102 until the one or more loss functions satisfy one or more criteria. In some embodiments, the online concierge system 102 uses gradient descent or any other suitable process to minimize the one or more error terms in various embodiments.

In response to the one or more loss functions satisfying the one or more criteria, the online concierge system 102 stops backpropagation of the one or more error terms. When backpropagation of the one or more error terms stops, the online concierge system 102 stores a set of parameters for the layers of the temporal availability model 222. For example, the online concierge system 102 stores the weights of connections between nodes in the network as the set of parameters of the network in a non-transitory computer readable storage medium. Hence, training of the temporal availability model 222 allows the online concierge system 102 to generate and to store a neural network, or other machine learning model, that generates a likelihood of an item of the example being available at a warehouse 110 at a combination of a time and a geographic location of the example. The online concierge system 102 may periodically retrain the temporal availability model 222 or may retrain the temporal availability model when one or more conditions are satisfied.

In some embodiments, the online concierge system 102 applies the trained temporal availability model 222 to each of at least a set of groups of items, warehouses 110, and combinations of time and geographic location to generate probabilities of different items being available at different warehouses at different combinations of times and geographic locations. The online concierge system 102 stores predicted likelihoods output by the temporal availability model 222 in association with a group of an identifier of an item, an identifier of a warehouse 110, and a combination of a time and a geographic location, allowing the online concierge system 102. In other embodiments, the online concierge system 102 stores the score determined for the group of an item, a warehouse 110, and a combination of time and geographic location in association with the group.

When the online concierge system 102 receives 440 a request to create an order from a user that identifies the warehouse 110 and a requested geographic location, the online concierge system 102 obtains 445 predicted likelihoods of various items, such as each item of a set or each item offered by the warehouse 110, being available at the warehouse 110 at the requested geographic location at different times. In some embodiments, the online concierge system 102 retrieves previously determined predicted likelihoods of items being available at the warehouse 110 at the requested geographic location at different times. Alternatively, the online concierge system 102 retrieves stored scores for groups of items, warehouse 110, and combination of times and geographic locations where the groups include the warehouse 110 and the requested geographic location identified by the request to create the order. The online concierge system 102 applies the temporal availability model to the retrieved groups to obtain 445 predicted likelihoods of different items being available at the warehouse 110 at the requested geographic location at different times.

When the online concierge system 102 receives a request for information about an item to include in the order, the online concierge system 102 generates 450 an interface including information about the requested item that includes predicted likelihoods of the item being available at the warehouse 110 in the geographic location identified by the request to create the order at different times. The online concierge system 102 transmits the interface to a client device of the user for display. For example, a client device of the user receives the interface from the online concierge system 102 and displays the interface in a customer mobile application 106 executing on the client device of the user.

Figure 5:
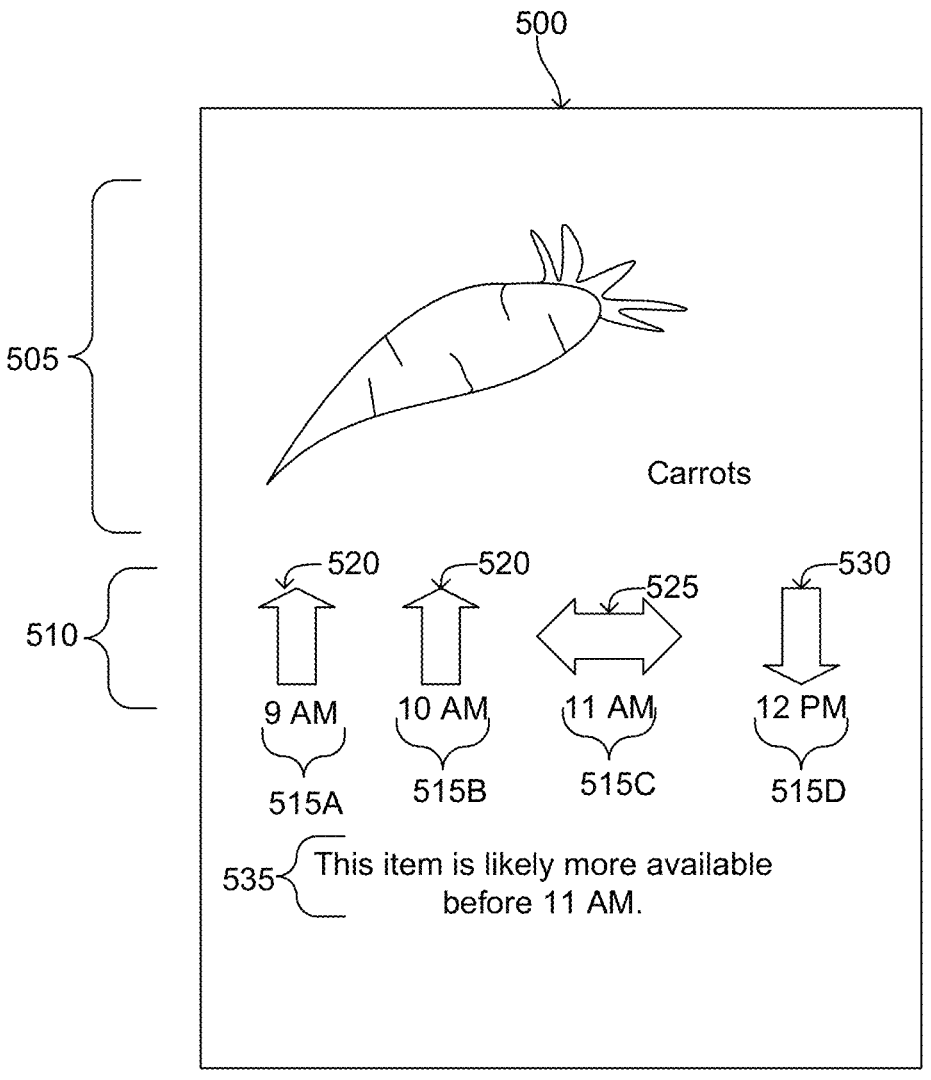
FIG. 5 is an example interface including predicted likelihoods of an item's availability at different times at a warehouse identified by an order, according to one embodiment.

FIG. 5 shows an example interface 500 generated 450 by the online concierge system 102 that includes predicted likelihoods of an item's availability at different times at a warehouse 110 identified by an order. In the example of FIG. 5, the interface 500 includes information 505 describing the item, such as a name and an image of the item. In other embodiments, the information 505 includes additional information, such as a price of the item or a description of the item, while any suitable information 505 to identify or to describe the item may be displayed by the interface 500 in various embodiments.

The interface 500 includes a temporal availability region 510 configured to display indications of the item's predicted availability at the warehouse 110 and the geographic location identified by the order at different times 515A, 515B, 515C, 515D (also referred to individually or collectively using reference number 515). For purposes of illustration, FIG. 5 shows an example where the times 515 correspond to different hours, but in other embodiments, the times 515 may be separated by any interval. For each time 515 displayed in the interface 500, the online concierge system 102 obtains a predicted likelihood of the item displayed by the interface 500 being available at the warehouse 110 and the geographic location identified by the order at the time 515, as further described above. Hence, the online concierge system 102 obtains a predicted likelihood of the item displayed by the interface 500 being available at the warehouse 110 and the geographic location identified by the order at time 515A, at time 515B, at time 515C, and at time 515D.

Based on the obtained predicted likelihoods of the item displayed by the interface 500 being available at the warehouse 110 and the geographic location identified by the order, the interface displays an indication of the item's predicted availability for different times 515. In the example of FIG. 5, the interface 500 displays an indication proximate to each time 515, with different indications displayed when the predicted likelihood of the item displayed by the interface 500 being available at the warehouse 110 and the geographic location identified by the order at the time 515 satisfies different conditions. In the example of FIG. 5, different indications correspond to different ranges of predicted likelihoods of the item displayed by the interface 500 being available at the warehouse 110 and the geographic location identified by the order at the time 515. For example, indication 520 in FIG. 5 corresponds to a first range of predicted likelihoods of the item displayed by the interface 500 being available at the warehouse 110 and the geographic location identified by the order at the time 515 corresponding to high predicted availability, while indication 525 in FIG. 5 corresponds to a second range of predicted likelihoods of the item displayed by the interface 500 being available at the warehouse 110 and the geographic location identified by the order at the time 515 corresponding to intermediate predicted availability. In FIG. 5, indication 530 corresponds to a third range of predicted likelihoods of the item displayed by the interface 500 being available at the warehouse 110 and the geographic location identified by the order at the time 515 corresponding to low predicted availability. In the example of FIG. 5, the predicted likelihoods of the item displayed by the interface 500 being available at the warehouse 110 and the geographic location identified by the order at times 515A and 515B is within the first range, so indication 520 is displayed in the interface 500 proximate to times 515A and 515B. Similarly, the predicted likelihood of the item displayed by the interface being available at the warehouse 110 and the geographic location identified by the order at time 515C in FIG. 5 is within the second range, so the interface 500 displays indication 525 proximate to time 515C. Additionally, the predicted likelihood of the item displayed by the interface being available at the warehouse 110 and the geographic location identified by the order at time 515D in FIG. 5 is within the range, so the interface 500 displays indication 530 proximate to time 515D. Hence, different indications displayed proximate to a time 515 correspond to different predicted likelihoods of the item displayed by the interface being available at the warehouse 110 and the geographic location identified by the order at different time 515, allowing the interface 500 to visually distinguish different predicted likelihoods of availability for different times 515, allowing a user to rapidly discern different likely availability of the item at the warehouse 110 and the geographic location at different times 515.

In some embodiments, the online concierge system 102 compares different predicted likelihoods of the item displayed by the interface being available at the warehouse 110 and the geographic location identified by the order at different times 515 and generates a summary 535 of predicted availability that is displayed by the interface 500. For example, the summary 535 identifies times 515 when the predicted likelihood of availability of the item at the warehouse 110 at the geographic location is within a range of predicted likelihoods corresponding to high availability. In other examples, the online concierge system 102 ranks times 515 based on corresponding predicted likelihoods of being available of the item displayed by the interface 500 at the warehouse 110 at the location so times 515 with higher predicted likelihoods have higher positions in the raking and selects times 515 having at least a threshold position in the ranking. The summary 535 displays the selected times 515, allowing the summary 535 to identify times 515 when the item has the highest predicted likelihood of being available at the warehouse 110 at the geographic location. Alternatively, the summary 535 identifies times 515 when the item has at least a threshold likelihood of being available at the warehouse 110 at the geographic location. Hence, the summary 535 allows the interface 500 to identify times 515 when the item is most likely to be available at the warehouse 110 at the geographic location.

Referring back to FIG. 4, the online concierge system 102 may leverage the temporal prediction model 222 to select one of multiple locations of the warehouse 110 identified by the request to create the order from which inventory information is displayed to the user. For example, a warehouse 110 has multiple warehouse locations that each correspond to physical locations of the warehouse 110. As an example, a warehouse 110 that is a supermarket has a plurality of locations each corresponding to different physical stores. When a user identifies a warehouse 110 having multiple locations in the request to create the order, the online concierge system 102 selects a warehouse location of the warehouse 110 and identifies an inventory of items available at the selected location of the warehouse 110 from which the user selects items via the online concierge system 102. As different warehouse locations of the warehouse 110 may have different inventories of items available at different times, which location of the warehouse 110 the online concierge system 102 selects affects which items are available for the user to include in an order.

To select a location of a warehouse 110 having multiple warehouse locations when the online concierge system 102 receives 440 the request to create an order, the online concierge system 102 identifies warehouse locations the warehouse 110 identified by the request that are within a threshold distance of a location identified by the request. In various embodiments, the online concierge system 102 determines the location identified by the selection from a location stored by the online concierge system 102 in association with the user, such as an address or another physical location included in a user profile maintained for the user by the online concierge system 102. As another example, the online concierge system 102 receives an input from the user specifying a location in the request to create the order. The online concierge system 102 retrieves warehouse locations of the selected warehouse 110, such as addresses of warehouse locations of the selected warehouse 110. The online concierge system 102 determines distances between various warehouse locations of the selected warehouse 110 and the and the location identified by the selection and identifies locations of the selected warehouse 110 that do not exceed a threshold distance of the location identified by the selection.

To account for differing availability of items in different identified warehouse locations of the selected warehouse 110, the online concierge system 102 obtains likelihoods of various items being available at different warehouse locations of the warehouse 110 at a time when the request to create the order was received 440. In some embodiments, the online concierge system 102 determines an average predicted likelihood of items offered by the warehouse 110 being available at each warehouse location. The online concierge system 102 selects a warehouse location having a maximum average predicted likelihood of items offered by the warehouse 110 being available and retrieves inventory information from the selected warehouse location that is used by the online concierge system 102 for display to the user during creation of the order.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving an input from a user device specifying a warehouse location;
obtaining predicted likelihoods of items offered by the warehouse location;
applying a temporal availability model to determine time-specific availability information of an item, wherein the temporal availability model is trained by:
obtaining training data comprising a plurality of examples, each example including a training warehouse, a training item, a combination of training time and training geographic location, and a score determined for the training warehouse, the training item, and the combination of training time and training geographic location, a tag applied to each example indicating whether inventory of the training warehouse had the training item available for shoppers at the combination of the training time and the training geographic location;
initializing a plurality of layers of a neural network, where the neural network is configured to receive data related to the training data to generate a predicted likelihood of an item being available at the warehouse at the combination of time and geographic location;

mapping each observation of a plurality of observations to a multi-dimensional feature space having dimensions corresponding to temporal information;
for each example derived from the observations:
determining, in the multi-dimensional feature space, feature-space distances between a selected combination of time and geographic location in mapped observations,
selecting a subset of the mapped observations as selected training examples based on the feature-space distance;
for each selected training examples selected from the subset of the mapped observation:
applying the temporal availability model to the training warehouse, the training item, the combination of training time and training geographic location, and the score determined for the training warehouse, the training item, and the combination of training time and training geographic location;
backpropagating one or more error terms obtained from one or more loss functions to update a set of parameters of the temporal availability model, the backpropagating performed through the neural network and one or more of the error terms based on a difference between a tag applied to the example and a predicted likelihood of the training item being available at the training warehouse at the combination of the training time and the training geographic location; and
stopping the backpropagation after the one or more loss functions satisfy one or more criteria; and
causing to display, at a user interface, the time-specific availability information of the item.

2. The computer-implemented method of claim 1, further comprising:
receiving a request from a user to create a selection for the warehouse location;
obtaining the predicted likelihoods one or more items of the selection being available at the warehouse location at a plurality of combinations of times and the warehouse location;
causing to display, at an interface, an indication of the predicted likelihood of each item of the selection being available at the warehouse at each time.

3. The computer-implemented method of claim 2, wherein causing to display an indication of the predicted likelihood of each item of the selection being available at the warehouse at each time comprises:
displaying a first indication proximate to a time of the plurality of times in response to a predicted likelihood of an item in the selection being available at the warehouse at a combination of the warehouse location and the time of the plurality of time being within a first range of predicted likelihoods;
displaying a second indication proximate to the time of the plurality of time in response to the predicted likelihood of the item in the selection being available at the warehouse location at the combination of the warehouse location and the time of the plurality of time being within a second range of predicted likelihoods; and
displaying a third indication proximate to the time of the plurality of time in response to the predicted likelihood of the item in the selection being available at the warehouse location at the combination of the warehouse location and the time of the plurality of time being within a third range of predicted likelihoods.

4. The computer-implemented method of claim 2, wherein causing to display an indication of the predicted likelihood of each item of the selection being available at the warehouse at each time comprises:

generating a summary for display in the interface that identifies one or more times of the plurality of times when the predicted likelihood of availability of an item in the selection at the warehouse location is within a range of predicted likelihoods.

5. The computer-implemented method of claim 2, wherein causing to display an indication of the predicted likelihood of each item of the selection being available at the warehouse at each time comprises:

ranking the times of the plurality of times based on corresponding predicted likelihoods for the times of the plurality of times and the warehouse location; and generating a summary for display in the interface that identifies one or more times of the plurality of times having at least a threshold position in the ranking.

6. The computer-implemented method of claim 1, further comprising:

receiving a selection of a time; and selecting a set of mapped observations as samples for a selected combination of the time and the warehouse location.

7. The computer-implemented method of claim 6, wherein selecting the set of mapped observations as samples for the selected combination of the time and the warehouse location comprises:

ranking observations based on associated determined distance from the selected combination of the time and the warehouse location, with observations having smaller determined distances from the selected combination of the time and the warehouse location having higher positions in the ranking;

selecting observations having at least a threshold position in the ranking as samples.

8. The computer-implemented method of claim 6, wherein a weight for a sample is inversely related to a distance between the sample and the selected combination of the time and the warehouse location.

9. The computer-implemented method of claim 1, further comprising recommending an alternative warehouse location, wherein recommending the alternative warehouse location comprises:

determining a weighted sum of availability of a selection of items;

determining a full availability score as a weighted sum of the items, each item with a label having a value indicating the item in the selection is available at the alternative warehouse location; and determining the score for the alternative warehouse location as a ratio of the weighted sum to a full availability score.

10. The computer-implemented method of claim 1, wherein applying the temporal availability model to determine time-specific availability information of the item comprises inputting contextual information to the temporal availability model, wherein the contextual information includes temporal information, geospatial information, and socioeconomic information.

11. A computer program product comprising a non-transitory computer readable storage medium having instructions encoded thereon that, when executed by one or more processors, cause the one or more processors to:

receive an input from a user device specifying a warehouse location;

obtain predicted likelihoods of items offered by the warehouse location;

apply a temporal availability model to determine time-specific availability information of an item, wherein the temporal availability model is trained by:

obtaining training data comprising a plurality of examples, each example including a training warehouse, a training item, a combination of training time and training geographic location, and a score determined for the training warehouse, the training item, and the combination of training time and training geographic location, a tag applied to each example indicating whether inventory of the training warehouse had the training item available for shoppers at the combination of the training time and the training geographic location;

initializing a plurality of layers of a neural network, where the neural network is configured to receive data related to the training data to generate a predicted likelihood of an item being available at the warehouse at the combination of time and geographic location;

mapping each observation of a plurality of observations to a multi-dimensional feature space having dimensions corresponding to temporal information;

for each example derived from the observations:

determining, in the multi-dimensional feature space, feature-space distances between a selected combination of time and geographic location in mapped observations, selecting a subset of the mapped observations as selected training examples based on the feature-space distance;

for each selected training examples selected from the subset of the mapped observation:

applying the temporal availability model to the training warehouse, the training item, the combination of training time and training geographic location, and the score determined for the training warehouse, the training item, and the combination of training time and training geographic location;

backpropagating one or more error terms obtained from one or more loss functions to update a set of parameters of the temporal availability model, the backpropagating performed through the neural network and one or more of the error terms based on a difference between a tag applied to the example and a predicted likelihood of the training item being available at the training warehouse at the combination of the training time and the training geographic location; and stopping the backpropagation after the one or more loss functions satisfy one or more criteria; and cause to display, at a user interface, the time-specific availability information of the item.

12. The computer program product of claim 11, wherein the instructions, when executed, further cause the one or more processors to:

receive a request from a user to create a selection for the warehouse location;

obtain the predicted likelihoods one or more items of the selection being available at the warehouse location at a plurality of combinations of times and the warehouse location;

cause to display, at an interface, an indication of the predicted likelihood of each item of the selection being available at the warehouse at each time.

13. The computer program product of claim 12, wherein the instruction to cause to display an indication of the predicted likelihood of each item of the selection being available at the warehouse at each time comprises instructions to:

display a first indication proximate to a time of the plurality of times in response to a predicted likelihood of an item in the selection being available at the warehouse at a combination of the warehouse location and the time of the plurality of time being within a first range of predicted likelihoods;

display a second indication proximate to the time of the plurality of time in response to the predicted likelihood of the item in the selection being available at the warehouse location at the combination of the warehouse location and the time of the plurality of time being within a second range of predicted likelihoods; and display a third indication proximate to the time of the plurality of time in response to the predicted likelihood of the item in the selection being available at the warehouse location at the combination of the warehouse location and the time of the plurality of time being within a third range of predicted likelihoods.

14. The computer program product of claim 12, wherein the instruction to cause to display an indication of the predicted likelihood of each item of the selection being available at the warehouse at each time comprises instructions to:

generate a summary for display in the interface that identifies one or more times of the plurality of times when the predicted likelihood of availability of an item in the selection at the warehouse location is within a range of predicted likelihoods.

15. The computer program product of claim 12, wherein the instruction to cause to display an indication of the predicted likelihood of each item of the selection being available at the warehouse at each time comprises instructions to:

rank the times of the plurality of times based on corresponding predicted likelihoods for the times of the plurality of times and the warehouse location; and generate a summary for display in the interface that identifies one or more times of the plurality of times having at least a threshold position in the ranking.

16. The computer program product of claim 11, wherein the instructions, when executed, further cause the one or more processors to:

receive a selection of a time; and select a set of mapped observations as samples for a selected combination of the time and the warehouse location.

17. The computer program product of claim 16, wherein the instruction to select the set of mapped observations as samples for the selected combination of the time and the warehouse location comprises instructions to:

rank observations based on associated determined distance from the selected combination of the time and the warehouse location, with observations having smaller determined distances from the selected combination of the time and the warehouse location having higher positions in the ranking;

select observations having at least a threshold position in the ranking as samples.

18. The computer program product of claim 16, wherein a weight for a sample is inversely related to a distance between the sample and the selected combination of the time and the warehouse location.

19. The computer program product of claim 11, wherein the instructions, when executed, further cause the one or more processors to recommending an alternative warehouse location, wherein the instruction to recommend the alternative warehouse location comprises instructions to:

determine a weighted sum of availability of a selection of items;

determine a full availability score as a weighted sum of the items, each item with a label having a value indicating the item in the selection is available at the alternative warehouse location; and determine the score for the alternative warehouse location as a ratio of the weighted sum to a full availability score.

20. A system comprising:

one or more processors; and memory configured to store code comprising instructions, the instructions, when executed by one or more processors, cause the one or more processors to:

receive an input from a user device specifying a warehouse location;

obtain predicted likelihoods of items offered by the warehouse location;

apply a temporal availability model to determine time-specific availability information of an item, wherein the temporal availability model is trained by:

obtaining training data comprising a plurality of examples, each example including a training warehouse, a training item, a combination of training time and training geographic location, and a score determined for the training warehouse, the training item, and the combination of training time and training geographic location, a tag applied to each example indicating whether inventory of the training warehouse had the training item available for shoppers at the combination of the training time and the training geographic location;

initializing a plurality of layers of a neural network, where the neural network is configured to receive data related to the training data to generate a predicted likelihood of an item being available at the warehouse at the combination of time and geographic location;

mapping each observation of a plurality of observations to a multi-dimensional feature space having dimensions corresponding to temporal information;

for each example derived from the observations:

determining, in the multi-dimensional feature space, feature-space distances between a selected combination of time and geographic location in mapped observations, selecting a subset of the mapped observations as selected training examples based on the feature-space distance;

for each selected training examples selected from the subset of the mapped observation:

applying the temporal availability model to the training warehouse, the training item, the combination of training time and training geographic location, and the score determined for the training warehouse, the training item, and the combination of training time and training geographic location;

backpropagating one or more error terms obtained from one or more loss functions to update a set of parameters of the temporal availability model, the backpropagating performed through the neural network and one or more of the error terms based on a difference between a tag applied to the example and a predicted likelihood of the training item being available at the training warehouse at the combination of the training time and the training geographic location; and stopping the backpropagation after the one or more loss functions satisfy one or more criteria; and cause to display, at a user interface, the time-specific availability information of the item.

\* \* \* \* \*